United States Patent [19]
DeHart et al.

[11] 4,125,898
[45] Nov. 14, 1978

[54] DIGITALLY SHAPED NOISE GENERATING SYSTEM

[75] Inventors: David A. DeHart, Hyattsville; James J. Ridgell, Jr., Elkridge, both of Md.

[73] Assignee: The Singer Company, Binghamton, N.Y.

[21] Appl. No.: 756,789

[22] Filed: Jan. 5, 1977

[51] Int. Cl.$^2$ .......................... G06F 15/34; G10L 1/08
[52] U.S. Cl. .................................. 364/718; 179/15 A; 179/15 M; 364/724
[58] Field of Search ............. 235/152, 156; 179/15 A, 179/15 SG, 15 SM; 181/139, 142; 324/77 R, 77 A, 77 B; 331/78; 333/18, 28 R, 70 T; 340/384 E; 364/718, 724

[56] References Cited
U.S. PATENT DOCUMENTS

| | | | |
|---|---|---|---|
| 3,578,912 | 5/1971 | Beavers, Jr. et al. | 179/1 SG |
| 3,614,400 | 10/1971 | Farnett et al. | 235/152 X |
| 3,700,869 | 10/1972 | Low | 235/152 |
| 3,723,911 | 3/1973 | Forney, Jr. | 333/18 |
| 3,800,093 | 3/1974 | Wolf | 333/70 X |
| 3,950,635 | 4/1976 | Constant | 235/156 |

OTHER PUBLICATIONS

R. Buron et al., "Noise Generated by Digital Technique," *IBM Tech. Disclosure Bulletin*, vol. 8, No. 9, 2-1966, p. 1232.

R. W. Schafer, "A Survey of Digital Speech Processing Techniques," *IEEE Trans. On Audio & Electroacoustics*, vol. AV-20, No. 1, 3-1972, pp. 28-35.

*Primary Examiner*—Jerry Smith
*Attorney, Agent, or Firm*—Ronald Reichman; Jeffrey Rothenberg

[57] ABSTRACT

This invention relates to a high-speed acoustic noise generating system that is under the control of a computer in order to produce spectrally shaped noise of any desired amplitude versus frequency shape. The foregoing is accomplished by randomly generating and serially storing binary noise in a first memory, by generating with a computer, filter coefficients and serially storing the filter coefficients in a second memory, and by individually adding and accumulating the filter coefficients generated by the computer when the serially correspondingly noise coefficient has the same polarity as the logic that triggers the apparatus of this invention.

6 Claims, 2 Drawing Figures

DIGITALLY SHAPED NOISE GENERATING SYSTEM

BACKGROUND OF THE INVENTION

1. Field of the Invention

This invention relates to electronic circuits and, more particularly, to devices for generating noise with computer-controlled spectral shaping.

2. Description of the Prior Art

Men and other animals are endowed with the ability to hear sounds. Sounds are either produced by nature or by men and animals. Inanimate nature produces the thunder of the storm, the roar and pounding of the surf, the whistling of the wind, the whispering of the trees, the patter of rain, the rippling and gurgling of running water and the creaking of snow, etc. Even more rich is the sound of living things; the barking and snarling of dogs, roaring of lions, hissing of snakes, chirping of birds and crying of infants, etc.

Finally man, not content with the racket around him over which he has little or no control, has contrived to produce sounds of almost infinite variety. The boom of cannons, the whir of machinery, and the ticking of clocks, etc. Thus, man is immersed in a world of sound and he expects to hear a particular distinct sound upon the happening of certain events.

There are far more to sounds than meets the ear. In fact, sounds are caused by the vibration of some medium. For a complete description of sound, one must know the sound spectrum, i.e., the sound power or amplitude being carried by the various frequencies in the audible and inaudible range.

Man has invented simulators and other training devices to teach students how to use and operate various types of equipment without undergoing the dangers that are inherent in the equipments' actual operation. In order for the student to receive the maximum training benefit while he uses a simulator, the simulator should make the same noises as the actual equipment.

One of the methods employed by the prior art to dynamically change the noise source comprised an analog random noise generator, the output of which was filtered by a bank of one-third octave filters. The output of each filter was when then attenuated by a computer-controlled attenuator to provide the correct level for each filter frequency band. The attenuators' outputs were summed to produce the spectral shape of the noise. A large number of filters are required in order to obtain any significant degree of noise shaping. Thus, the above method is costly and requires a large amount of space.

SUMMARY OF THE INVENTION

This invention overcomes the disadvantages of the prior art by providing an inexpensive electronic circuit under the control of a computer that efficiently generates spectrally shaped noise (with any desired amplitude versus frequency shape). By utilizing a pseudo random binary number sequence generator employing maximum length shift register feedback connections and a Finite Impulse Response (FIR) filter, the apparatus of this invention eliminates the necessity of multiplying each FIR filter stage to generate spectrally shaped noise. The pseudo random noise generator is implemented by a plurality of shift registers connected in series with exclusive OR (binary adder) gates. The art of using maximum length feedback techniques to incorporate primitive irreducible polynomial feedback connections in shown in W. Peterson's book entitled "Error Correcting Codes" which was published by MIT Press in 1961. There the outputs of the attenuators are summed to produce the component spectral shape of the desired noise.

The output of the pseudo random binary number sequence generator is transmitted to the FIR filter where the basic convolution function is performed according to the following equation:

$$Y(T) = \sum_{i=0}^{N-1} a(i) X(T-i)$$

where:
$X(T)$ equals the binary sequence 0.1
$a(i)$ are the filter coefficients
$Y(T)$ is the shaped digital noise signal, and
$N$ is the number of stages.

The coefficients $a(i)$, where $i = 0,1 \ldots N-1$ are developed by the computer using standard FIR filter coefficient generation techniques which are described in Chapter 3 of "Theory and Application of Digital Signal Processing" by L. Rainer and B. Gold which was published by Prentice-Hall in 1975. The aforementioned coefficients are then loaded into the external FIR filter random access coefficient storage memory and thus define the filter shape (amplitude versus frequency). The output $Y(T)$ is either put through a digital-to-analog converter and low-pass alias filter to produce the analog time domain signal of the desired shaped noise spectra or further processed and combined with other signals in the digital domain.

This invention provides an efficient implementation of the above FIR convolution equation by eliminating the necessity of performing the N multiples. The reason why this invention accomplishes the foregoing is that the noise data stream of this invention is one bit wide and thus it is only necessary either to add or not add the filter coefficient.

Thus, this invention is a high-speed noise generating circuit that produces noise with arbitrary spectral shaping (amplitude versus frequency) while being under the control of a computer.

The apparatus of this invention is capable of producing narrow band or broad band noise sound. Thus, various types of sounds may be produced for entertainment or training purposes, etc.

It is an object of this invention to provide a new and improved system for producing sounds.

It is another object of this invention to provide a new and improved electronic circuit that generates spectrally shaped noise that can be dynamically changed while being under the control of a computer.

It is a further object of this invention to provide a new and improved electronic circuit that generates wider and finer shaped broadband noise with any desired amplitude versus frequency shape.

Further objects and advantages of this invention will become more apparent as the following description proceeds, which description should be considered together with the accompanying drawings.

DESCRIPTION OF A PREFERRED EMBODIMENT

Figure 1:
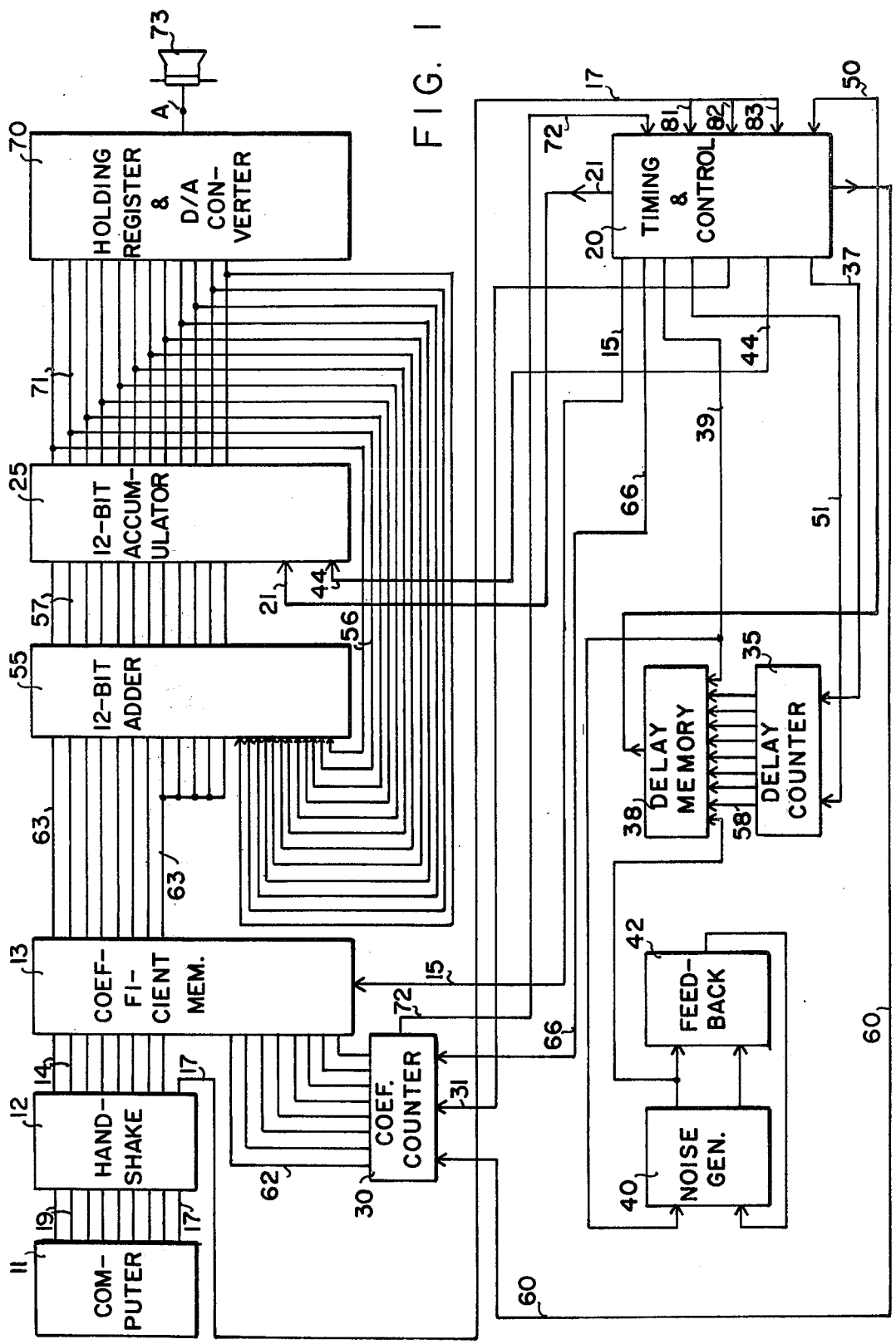
FIG. 1 is a schematic block diagram of the apparatus of this invention.

Referring now to the drawings in detail and, more particularly, to FIG. 1, the reference character 11 represents a computer that generates control signals that are transmitted to timing and control 20 via line 17 and handshake 12 in order to cause timing control 20 to clear the coefficient counter 30 via line 31 and send coefficient memory 13 write pulses via line 15. After computer 11 loads the N digital coefficients into coefficient memory 13 (in the remainder of this disclosure we will assume that $N = 256$), the computer 11 transmits on line 83 a logic high signal to enable the control and timing logic 20 so that this system may generate the digital filter convolution cycle hereinafter described. In order to accomplish the aforegoing, handshake control 12 must be synchronous and electrically compatible with computer 11 and coefficient memory 13.

The noise samples stored in the delay memory 38 are one-bit samples that are generated by noise generator 40 and feedback 42. The output of generator 40 is a pseudo random noise sequence of logic "ones" and "zeros". The aforementioned sequence is pseudo random because it repeats itself due to the fact that generator 40 has a finite length. The finite length of generator 40 is selected so that its sequence period will be long with respect to the correlation time of the human ear or processor (typically over 5 minutes). Thus, when one analyzes the amplitude versus frequency characteristics of the output signal of generator 40, it is a flat distribution or white noise. The outputs of generator 40 are coupled to feedback circuit 42, and the output of feedback circuit 42 is coupled to the input of generator 40 in order to obtain a maximum length random noise sequence. The output of generator 40 is also coupled to the data input of delay memory 38.

A reset pulse is generated in timing control 20 in order to begin the digital filter convolution cycle. The aforegoing pulse clears accumulator 25 via line 21 and loads holding register and D/A converter 70 via line 21 with the previous computer-generated digital filter sample. The reset pulse enables the delay line counter 35 via line 37 and enables the coefficient counter 30 via line 60. Timing control 20 transmits a clock signal to coefficient counter 30 via line 66 in order to advance the coefficient counter through 256 counts. Timing control 20 transmits another clock signal via line 51 to delay counter 35 in order to permit the delay counter 35 to sequentially advance through 256 counts. Timing control 20 is also responsible for sending a signal via line 44 to accumulator 25 in order to permit accumulator 25 to accumulate information. During the first clock period of the convolution clock, the 8-bit coefficient data contained in memory location zero of coefficient memory 13 is added to the 12-bit output (which is zero for the first clock period) contained in accumulator 25 by the 12-bit adder 55. If the random sample is a logic low, a clock signal appears on line 44 and the output of adder 55 is thereupon loaded into accumulator 25 via lines 57 at the end of the first and each subsequent clock period of the convolution clock. Thus, the output of adder 55 will be loaded into accumulator 25 each time a signal is present on line 44.

Accumulator 25 has two 12-bit outputs, one of which is connected to 12-bit coefficient adder 55 via lines 56. If the noise sample that corresponds to a particular memory location $i$ in memory 38 (that is now being sampled) is a logic zero, the corresponding filter coefficient will be added to the number stored in accumulator 25. However, if the noise sample that is currently being sampled is a logic one, then in that event the corresponding filter coefficient $\alpha(i)$ will not be added to the number stored in accumulator 25. The output of adder 55 is transmitted to accumulator 25 via lines 57. The 8-bit output of delay line counter 35 is transmitted to delay memory 38 via lines 58. Delay counter 35 is used to address the delay memory 38. This is done to sequence the delay memory so that the entire 256 bits that are stored in delay memory 38 may be sequentially transmitted to accumulator 25 via line 50, via timing logic 20, and via line 44.

Delay memory 38 has N delay elements where the delay for each element is $1/f_s$ and the number of delay elements used depends upon the type of noise frequency shaping required. The number of delay elements will be the same amount as the number of coefficients stored in coefficient memory 13. For example, the larger the number of delay elements N that are used, the greater the degree of frequency shaping that may be obtained. Delay memory 38 is loaded with one bit of information when the load strobe signal that was generated by timing logic 20 arrives during the 256 convolution clock periods which is hereinafter described. The loading of the delay memory 38 is such that the oldest noise sample is replaced by a new noise sample every $1/f_s$ time increments. At the beginning of the second clock period of the convolution clock, the coefficient counter 30 is incremented by a count of one via line 66 to present address location one. The coefficient memory 13 is also set to address location one via line 62. The delay counter 35 is incremented by a count of one via line 51 to present address location $i + 1$.

Output lines 58 of delay counter 35 are used to address delay memory 38. After the incrementation of counters 30 and 35 as hereinbefore discussed, the 8-bit coefficient data in present memory location one of coefficient memory 13 is added to the 12-bit output of the 12-bit accumulator 25 in the 12-bit adder 55. The output sum of adder 55 is then loaded into accumulator 25 via lines 57 at the end of the second clock period of the convolution clock if the noise bit sample coming from delay memory 38 via line 50 is a logic zero. If the noise sample is a logic one, then in that event the output sum of adder 55 is not loaded into the 12-bit accumulator 25 for the reason that timing and control 20 will not send a pulse via line 44. At the beginning of the third clock period, the coefficient counter 30 and the delay counter 35 are incremented by a count of one. The above process is repeated once for every 256 clock periods of the convolution clock. However, for the first cycle of this invention there might not be 256 counts since when this invention is first turned on it might be at any location. In any event, all following complete cycles will contain 256 counts.

At the beginning of the 256the clock period, the coefficient counter 30 generates a pulse which is transmitted via line 72 to timing control 20 and is used by the timing control 20 to disable the coefficient counter 30 and delay counter 35 via line 60 and 37 respectively. At this instant, the digital filter 12-bit noise sample appears at the output of the accumulator 25 and waits for the next reset signal that is transmitted via line 21 to strobe the information stored in the accumulator into holding register and D/A converter 70. At the end of the 256th clock period, the timing and control logic 20 generates a pulse via line 39 to load the delay memory 38 (address i + 255) with a random noise sample (single bit) from the pseudo random noise generator 40 via line 58. At the same time as the aforegoing, the noise generator 40 is clocked via line 39 to present the next single bit noise sample at the output of generator 40 for the next convolution cycle. If it is desired, the output of holding register and D/A converter 70 may be combined with other signals at point A to create a composite signal. The outputs of D/A converter 70 are coupled to speaker 73.

Figure 2:
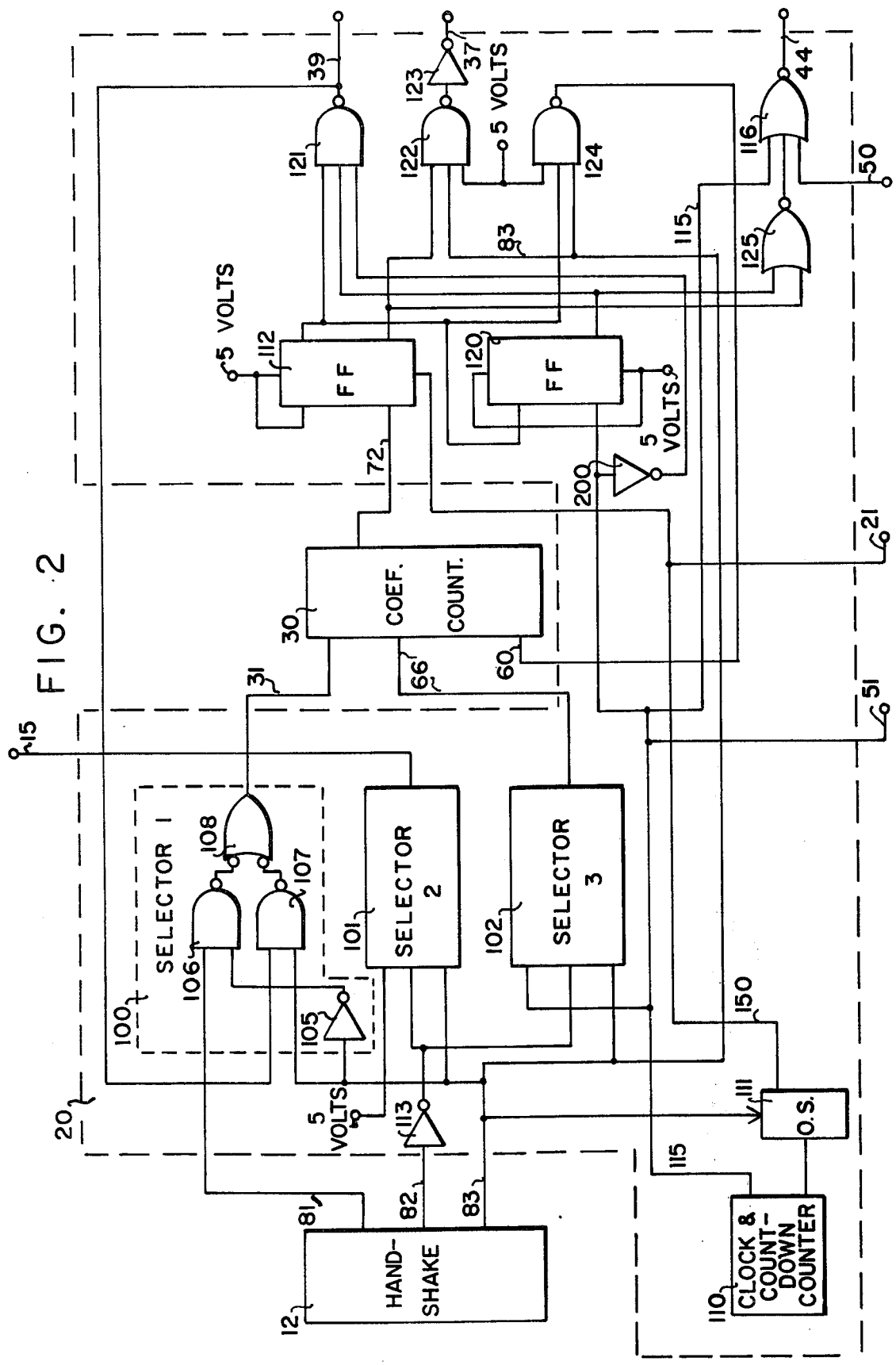
FIG. 2 is a logic diagram showing the timing control 20 in greater detail.

FIG. 2 is a logic diagram showing the timing control 20 of FIG. 1 in greater detail and the interconnection of timing control 20 to portions of the circuit shown in FIG. 1. Character 12 represents the handshake with the eight output lines that are connected to coefficient memory 13 deleted. Handshake 12 has three outputs 81, 82 and 83. Lines 81, 82 and 83 are branches of line 17 (FIG. 1) with one end connected to computer 11. Line 83 transmits the computer-generated enable signal. When the enable signal is a logic zero, selector 100, 101 and 102 selects the computer-generated signals transmitted on lines 81 and 82 for loading the coefficient memory 13 with coefficient data. Selector 100 comprises inverter 105, NAND gates 106 and 107 and NOR gate 108. Selectors 101 and 102 are not shown in detail since they have the same components as selector 100. The signal transmitted on line 81 is used for clearing the coefficient counter 30 so that the first 8 bits of coefficient data may be loaded into the zero location of coefficient memory 13. Line 82 transmits the data strobes from computer 11 (FIG. 1). The data strobe signal is inverted by inverter 113 and passes through selector 101 to coefficient memory 13 via line 15 to cause the loading of coefficient memory 13. The output of inverter 113 is also transmitted to the input to selector 102, and the output of selector 102 is transmitted via line 66 to advance coefficient memory counter 30.

The computer-generated enable signal that is transmitted on line 83 is one of the inputs of NAND gate 122 and NAND gate 124. The other signals that cause the enabling of gates 122 and 124 will be described below. The output signal of gate 122 is inverted by inverter 123 and transmitted via line 37 to inhibit the delay counter 35. Coefficient memory counter 30 is advanced to the next count by the output signal of gate 124 that is transmitted on line 60. One-shot 111 is inhibited by the enable signal transmitted on line 83.

When the computer enable signal transmitted on line 83 is a logic zero, the timing and control logic 20 will use the computer signals that are transmitted on lines 81 and 82 to control the coefficient memory 13 and coefficient counter 30 for computer loading of the 8-bit coefficient data. The signal transmitted on line 83 also inhibits the reset signal from loading the holding register and D/A converter 70 via line 21 and inhibits the delay line counter 35 from incrementing.

After the computer sends the 256 coefficient data write strobe via line 82, the computer 11 enable signal transmitted on line 83 is changed to a high logic level. This enables the control and timing logic 20 to select the internal generated clocks and pulses for control of the coefficient memory 13 and coefficient counter 30.

The timing and control logic 20 generates two clocks. The first is developed by a 4 mHz crystal oscillator 110. This clock is the convolution clock and its pulses are transmitted on line 115. The second clock, a 2 kHz clock, is derived from the countdown counters 110. This clock is fed into a one-shot 111 in order to generate a timing pulse (30 ns wide) at the leading edge of the clock transmitted by line 150. The signal transmitted on line 150 represents the sample clock or the rate at which the digital filter samples are being computed.

The signal transmitted on line 150 starts the digital filter convolution cycle by clearing flip flop 112. One of the outputs of flip flop 112 is coupled to one of the inputs of NAND gate 122, and the output of gate 122 is inverted by inverter 123 to cause the enabling of delay counter 35 via line 37. Another output of flip flop 112 is coupled to one of the three inputs of NAND gate 124. The second input of NAND gate 124 is connected to a 5-volt power source and the third input of gate 124 is coupled to the computer 11 enable signal that is transmitted on line 83. Gate 124 is enabled and its output is transmitted via line 60 to enable the coefficient counter 30. The aforementioned output of flip flop 112 is also responsible for enabling accumulator 25. This is accomplished by the output of flip flop 112 enabling NOR gate 125, and the output of NOR gate 125 enables NOR gate 116 whose output is transmitted to accumulator 25 via line 44. Therefore, during the 256 convolution clock periods line 37 will transmit a logic high signal in order to permit delay counter 35 to count, line 60 will transmit a logic high signal so that coefficient counter 30 may count, line 44 will transmit a clock pulse to enable accumulator 25 to accumulate information when a low noise sample bit appears on line 50 and causes the enabling of NOR gate 166. However, if the noise sample bit is a logic high, the NOR gate 116 is inhibited and the accumulator 25 is not loaded with the 12-bit value out of the adder 55.

The leading edge of the 256th convolution clock pulse is transmitted on line 66. This pulse causes the coefficient counter 30 to generate a positive carry pulse which is transmitted to flip flop 112 via line 72. The leading edge of the aforementioned pulse clocks flip flop 112 such that the Q output state becomes a logic high. This condition disables the coefficient counter via NAND gate 124, disables the delay counter via NAND gate 122, and enables NAND gate 121. In the middle of the 256th convolution clock period, the inverted convolution clock goes to a logic high via inverter gate 200 which enables the NAND gate 121. At this time the output of gate 121 goes low and clears the coefficient counter and loads the delay memory with a noise sample via line 39. At the end of the 256 convolution clock period, flip flop 120 is clocked such that the Q output goes to a logic low which disables the NOR gate 116 and therefore stops accumulator 25 from accumulating. The Q output of flip flop 120 disables NAND gate 121 and the output of gate 121 is a logic high which causes the removal of the coefficient counter clear signal via NAND gate 107, NOR gate 108 and the load strobe to the delay memory 38 is transmitted via line 39. At this time, the digital filter sequence is complete with the filtered sample available at the output of the 12-bit accumulator 25. The holding register and D/A converter 70 is loaded with the filtered 12-bit sample at the beginning of the next digital filter cycle and the output of the 12-bit accumulator 25 is loaded into holding register and D/A converter 70 so that the above system is ready to begin counting and processing a new 256 count cycle.

The above specification has described a new and improved system for generating noise spectra with arbitrary spectral shaping (amplitude versus frequency)

while being under the control of a computer. It is realized that the above description may indicate to those skilled in the art additional ways in which the principles of this invention may be used without departing from its spirit. It is, therefore, intended that this invention be limited only by the scope of the appended claims.

What is claimed is:

1. An acoustic system under the control of a computer for digitally generating spectrally shaped noise of any desired amplitude versus frequency shape by using a simple additive process, said system comprising:
   a. means for serially generating one bit wide random noise;
   b. a first memory coupled to said generating means for sequentially storing the noise received from said generating means;
   c. a first counter coupled to said first memory for sequentially addressing the memory locations contained in said first memory;
   d. a second memory coupled to said computer for sequentially storing the digital time impulse response coefficients that represent the amplitude versus frequency shape of said noise which has been generated by said computer;
   e. a plurality of selectors coupled to said computer and said second memory for loading, clearing and incrementing said second memory with digital time impulse response coefficients;
   f. a second counter coupled to said second memory for sequentially addressing the memory locations contained in said second memory;
   g. an adder coupled to said second memory for adding the digital time impulse response coefficient currently being processed;
   h. a hold register the input of which is coupled to the output of said adder and, the output of said hold register is coupled to the input of said adder so that said hold register will only store the output of said adder if the noise currently being sampled has the same polarity as the logic that triggers said system; and
   i. cyclic timing means coupled to said first memory, said second memory, said first counter, said second counter, said adder and said hold register for maintaining said system in synchronization whereby upon the completion of a cycle of said timing means the output of said hold register will be spectrally shaped digital noise samples.

2. The system defined in claim 1 wherein said generating means is a pseudo random binary sequence generator.

3. The system defined in claim 2 wherein said pseudo random binary sequence generator employs maximum length shift register techniques and primitive irreducible polymonial feedback connections.

4. The system defined in claim 1 wherein said generating means comprises: a plurality of shift registers; a plurality of exclusive OR gates coupled in series to said shift register in order to act like a feedback circuit.

5. The system defined in claim 1 further including a digital-to-analog converter coupled to the output of said hold register for producing analog time domain samples of the desired shaped noise spectra.

6. The system defined in claim 1 wherein said timing means is a clock oscillator.

UNITED STATES PATENT AND TRADEMARK OFFICE
CERTIFICATE OF CORRECTION

PATENT NO. : 4,125,898
DATED : November 14, 1978
INVENTOR(S) : David A. DeHart et al It is certified that error appears in the above-identified patent and that said Letters Patent are hereby corrected as shown below:

Insert the following paragraph in column 1 preceeding "Background of the Invention":

The United States Government has rights in this invention pursuant to Contract Number N61339-75-C-0112 awarded by the Department of the Navy.

Signed and Sealed this

Thirteenth Day of March 1979

[SEAL]

Attest:

RUTH C. MASON
Attesting Officer

DONALD W. BANNER
Commissioner of Patents and Trademarks